R. R. Stevens.
Crank Paddle.
No. 70,130. Patented Oct. 22, 1867.

Witnesses.

Inventor
Romulus Stevens
By his Atty's Dewey & Co.

United States Patent Office.

ROMULUS R. STEVENS, OF MOKELUMNE HILL, CALIFORNIA.

Letters Patent No. 70,130, dated October 22, 1867.

IMPROVED MEANS FOR PROPELLING VESSELS.

The Schedule referred to in these Letters Patent and making part of the same.

TO ALL WHOM IT MAY CONCERN:

Be it known that I, ROMULUS R. STEVENS, of Mokelumne Hill, county of Calaveras, State of California, have invented certain new and useful improvements in Paddles for Steam-Vessels; and I do hereby declare the following description and accompanying drawings are sufficient to enable any person skilled in the art or science to which it most nearly appertains to make and use my said invention or improvements without further invention or experiment.

The nature of my invention is to provide a paddle or paddles for steam-vessels combining a powerful means for propelling a craft swiftly through the water, overcoming the dead weight or lifting of the water, whereby so great a power is expended and lost as where the rotary wheel and paddles are used.

To accomplish this object a frame of wood or other material is constructed at the sides of the vessel, in which the paddles are placed, which consists of two smaller iron frames upon each side, supported by suitable shafts placed across the wooden frame the two iron frames being connected by double eccentrics or cams, with crank-shafts operating in gears. These cranks connect at each end to a double piston-rod, the paddles being vertically attached to upright bars which extend up through the iron frames. To more fully illustrate and describe my invention, reference is had to the accompanying drawings, and letters marked thereon, of which—

Figure 1:
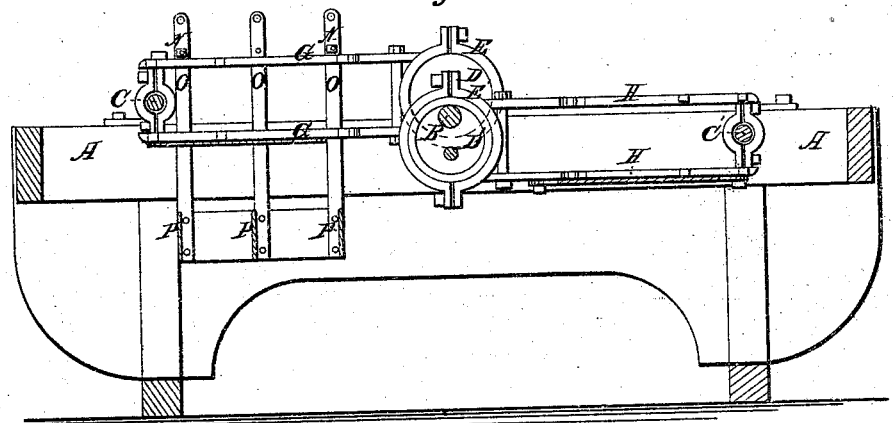
Figure 2:
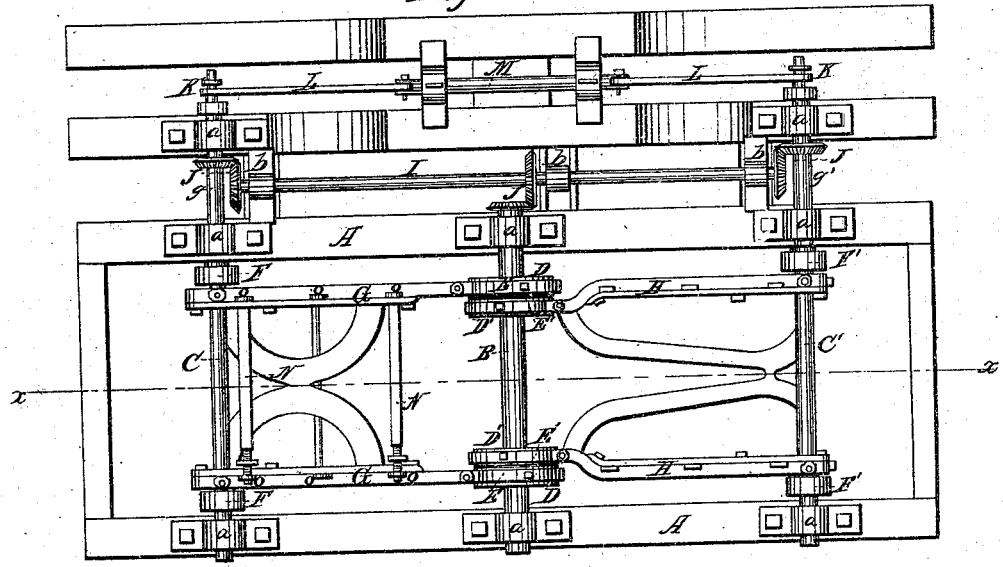

Figure 1 is a side sectional elevation, taken through the line $x\ x$.

Figure 2, a plan.

Similar letters indicate like parts in each of the figures.

A is a frame supporting the machinery which in a vessel would project beyond the sides over the water. A shaft, B, extends across this frame, and has keyed to it four eccentrics or cams working in pairs, D D being one pair, and D' and D' the other, working opposite. Substantial iron frames G G H H are attached to the eccentrics by straps E and E', and extend in opposite directions, parallel with the sides of the vessel, their other ends being attached to the shafts C C', which serve as crank-pins to the cranks F F'. These cranks have the same throw as the eccentrics D D', thus keeping the frames G and H horizontal in their motion, and moving both ends alike. To insure a parallel and regular motion the crank and eccentric-shafts are connected by bevel-gears J J J', the pinions being fastened to said shafts, while the wheels are attached to a longitudinal shaft, I. The shafts $g$ and $g'$, to which the cranks F F' are fastened, have the cranks $k\ k$ at their opposite ends. These cranks are operated by the connecting-rods L L. M represents the piston-rod, which extends through both cylinder-heads, and is connected at each end to the rods L, thus giving motion to the shafts $g\ g'$ and the shaft I. The gearing J' turning the eccentric-shaft $a\ a\ b\ b$, are the boxes supporting the shafts B, $g\ g'$, and I. Slots are made in the upper and lower bars of the frames, up through which the vertical paddle-bars O O extend. The paddles P P are connected to the lower portion of the vertical bars, being attached in the form of a hollow square, with one or more paddles placed transversely across the centre, their opposite ends being bent around rods, by which means they are held more firmly together. Each of the paddle-frames is stayed in a proper manner by inner cross-braces. Connecting-rods H, having set-nuts, are placed across the frames, for raising and lowering the paddles, by changing the rods into holes or slots in the vertical paddle-bars.

Having thus described my invention, I am well aware that vertical paddles are known, and that attempts have been made to use them in certain forms for propelling vessels; but by certain defects in their application to the machinery, and a want of parallelism and continuity of action, they were rendered practically useless. What I therefore claim as new in my invention, and desire to secure by Letters Patent, is—

The combination and arrangement of the cams D D and D' D' with the frames H and G and cranks F and F', constructed and arranged to operate the paddles P, as described.

ROMULUS R. STEVENS. [L. S.]

Witnesses:
E. SHUBAND,
C. J. McSEMAN.